Feb. 19, 1946. G. ETZEL ET AL 2,395,321

MAKING TRANSPARENT CAMPHOR TABLETS

Filed March 15, 1944

Gastao Etzel
Thomas E. Dillon
INVENTORS

BY
Edwin C. Woodhouse
ATTORNEY

Patented Feb. 19, 1946

2,395,321

UNITED STATES PATENT OFFICE 2,395,321

MAKING TRANSPARENT CAMPHOR TABLETS

Gastao Etzel, Newark, and Thomas Edward Dillon, Wilmington, Del., assignors to E. I. du Pont de Nemours & Company, Wilmington, Del., a corporation of Delaware Application March 15, 1944, Serial No. 526,616

7 Claims. (Cl. 18—55)

This invention relates to a process for making permanently transparent tablets of camphor.

It has long been desired to obtain tablets of camphor which will be permanently transparent. Many attempts have been made to produce tablets of this character, but generally without success. When melted camphor is cooled to solid form, the resulting product is opaque. Flaked camphor is also opaque and tablets are frequently made therefrom by pressing in a suitable die. The resulting product is generally opaque. If, in making the usual tablets, sufficient pressure is employed, there will result a tablet which is transparent, but which will become opaque on standing for several hours.

It is an object of our invention to provide a novel and simple method for making permanently transparent tablets of camphor. A further object is to provide a method for converting opaque camphor to permanently transparent camphor. A particular object is to produce permanently transparent tablets of camphor directly from flake or molten camphor. Still other objects will appear hereinafter.

The above and other objects may be accomplished in accordance with our invention which comprises placing a charge of opaque camphor in a die of the desired form and dimensions and provided with at least one orifice, applying pressure to the charge of camphor sufficient to render the camphor plastic and to cause it to conform to the die while preventing extrusion of the camphor through the orifice, then continuing the pressure and causing a small proportion of the camphor to be extruded through the orifice and then releasing the pressure from the charge, meanwhile maintaining the charge at a temperature below 175° C. during the application of the pressure. We have found that, if the camphor is subjected to the same pressures in a die without an orifice or if a die with an orifice is employed and the pressure is released after the formation of the tablet but before extrusion takes place, the tablets obtained were opaque or were only temporarily transparent, becoming opaque on standing. However, when a die, containing an orifice, is employed and the pressure is continued sufficiently long to cause the camphor to flow and a small proportion thereof to be extruded through the orifice, then the tablet obtained is transparent and remains transparent over long periods of time such that it may be termed permanently transparent. Employing glass apparatus, it was noted that, upon applying pressure to the charge of camphor, the camphor lost its crystal structure and became plastic and transparent, the transparency increasing in depth during the tableting operation and being only temporary if the pressure was released without extrusion taking place, but the transparency being permanent when extrusion was caused to take place.

The die, which is to be used for this process, may be round, square, rectangular or other shape, depending upon the desired shape of the block or tablet of camphor. The die must be provided with an orifice in the region of the charge, which will generally be at or near the base of the die. The orifice may be as small as $\frac{1}{32}$ inch in diameter and may be as large as desired. Preferably, the orifice should be sufficiently small so that pressure can be built up in the die, due to the pressing action of the plunger on the camphor charge, sufficient to render the camphor plastic and shape it to the desired form. We have found that orifices of from $\frac{1}{32}$ inch to $\frac{1}{8}$ inch in diameter will permit the building up of the desired pressure before extrusion through the orifice will take place. The orifice may be considerably larger. In the case of large orifices, however, it will be necessary to provide means for closing the orifice to prevent extrusion during the shaping of the tablet and for opening the orifice to permit the desired extrusion to take place after the tablet has been formed. Such means may take the form of a plug, a slide valve or the like. The die may be provided with a single orifice or a number of orifices. In general, it will be desirable to increase the number of orifices with increase in the size of the die, particularly with increase in the surface area of the die, in order to obtain the best results. In dies of the size which are ordinarily employed for making tablets of camphor, from 1 to 3 orifices of from $\frac{1}{32}$ inch to $\frac{1}{8}$ inch in diameter will produce satisfactory results.

In order to more clearly illustrate our invention, representative dies are shown in the accompanying drawing in which.

Figure 2:
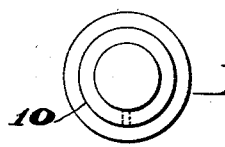
Fig. 2 is a top plan view of the die of Fig. 1.
Figure 1:
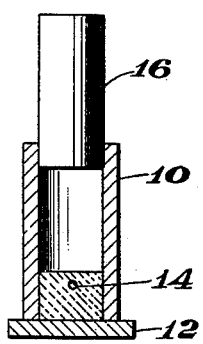
Fig. 1 is a side view of one form of a die which may be employed to carry out our invention, parts being broken away for clearness of illustration.

Referring in more detail to Figs. 1 and 2, the die 10 is a cylindrical die having an inside diameter of $\frac{1}{2}$ inch, a base 12 and a $\frac{1}{16}$ inch orifice 14 extending through the side wall near the base of the die. A plunger 16 is provided for applying pressure to the charge of camphor in the die.

Figure 4:
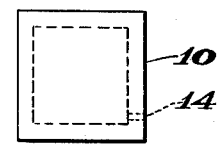
Fig. 4 is a top plan view of the die of Fig. 3.
Figure 3:
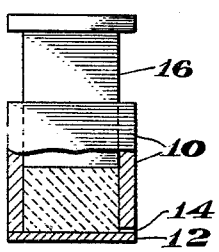
Fig. 3 is a side view with parts broken away of another form of die.

Figs. 3 and 4 illustrate a 1 inch square die of cubic shape having a volume of approximately 1 cubic inch and containing a 1/16 inch orifice 14 near the base thereof.

Figure 6:
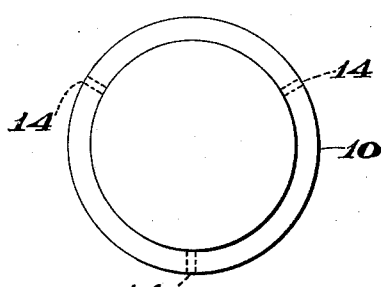
Fig. 6 is a top plan view of the die of Fig. 5.
Figure 5:
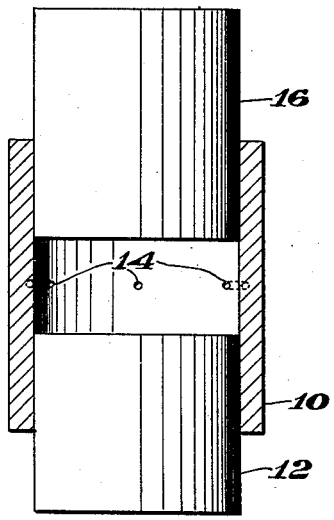
Fig. 5 is a side view with parts in section of a third form of die.

Figs. 5 and 6 illustrate a cylindrical die 10 of about 2 inches in diameter provided with 3 orifices 14 of 3/32 inch in diameter each and having a volume which will contain a charge of camphor of about 3 cubic inches. This die is also provided with a base 12 and a plunger 16.

In operation, a charge of opaque camphor is introduced into the die and maintained at a temperature below the melting point of the camphor, that is, below 175° C. Pressure is then applied to render the camphor plastic and cause it to flow and conform to the shape of the die so as to form a tablet of the desired size and shape. The pressure is continued until a small proportion of the camphor is caused to be extruded through the orifice, whereupon the pressure is released and the transparent tablet is removed from the die. It is essential that a small proportion of the camphor be extruded through the orifice, after the camphor has been rendered plastic and formed in the desired shape, in order to produce the transparent tablets of our invention.

The opaque camphor, employed in our process, may be flaked U. S. P. camphor. Alternatively, liquid camphor may be introduced into the die and allowed to cool to the desired temperature, whereupon the charge is a mass of opaque camphor. Pressure is then applied as in the case of the flaked camphor.

The temperatures employed may be any desired temperature below the melting point of the camphor. Generally, the die and the charge will be maintained at temperatures of from about 20° C. to about 170° C. Camphor has a melting point of 175 to 177° C. Generally, it will be preferred to employ elevated temperatures of approximately 140° C.

The pressures employed may vary from a few pounds to several thousand pounds per square inch, depending upon the temperature employed. Those skilled in the art are well aware of the pressures required to render camphor plastic at the various temperatures. For example, at 140° C., pressures of approximately 6,500 pounds per square inch will be required. The length of time, which the charge will be subjected to the pressures and temperatures, may vary from a fraction of a second to several minutes depending upon the temperatures and pressures employed.

It is only necessary to extrude a very small proportion of the camphor, generally less than 1% of the charge, in order to produce transparent camphor in accordance with our invention. Generally, the amount extruded may be varied from about 0.01% to about 10% of the total charge. Usually, the extrusion of more than 1% will be undesirable as constituting a waste of camphor and needless handling thereof.

In order to more clearly illustrate our invention and the preferred modes of carrying the same into effect, the following examples are given:

Example I

A charge of opaque flaked camphor of about 0.2 cubic inch was introduced into a cylindrical die, corresponding to that of Figs. 1 and 2, with an inside diameter of 1/2 inch and containing an orifice of 1/16 inch through the side wall. Pressure was applied by means of a hand press. The temperature was atmospheric. Upon extruding a small amount, less than 1%, of the charge, the pressure was released and the tablet removed—it was practically transparent.

In following the same procedure with the same equipment but with the orifice plugged, opaque tablets resulted.

Example II

A charge of opaque flaked camphor of about 1 cubic inch was introduced into a die of cubic shape and approximately 1 cubic inch in volume, containing a 1/16 inch orifice at the base, illustrated in Figs. 3 and 4. The die was placed in a hydraulic press and heated to 140° C. Pressure was then applied, approximately 6,500 lbs. per square inch, acting for 0.5 second. Upon extrusion of less than 1% of the charge, a permanently transparent camphor tablet, weighing about 0.5 ounce, resulted.

On carrying out the same procedure with a die that contained no orifice, transparent tablets were obtained but they became noticeably opaque on standing for several hours.

Example III

A charge of about 1 ounce of opaque flaked camphor was introduced into a cylindrical die corresponding to that shown in Figs. 5 and 6 having an inside diameter of 2 inches and 3 orifices 3/32 inch in diameter. Pressure was applied until a small proportion, less than 1%, of the charge had been extruded through the orifices. The resulting tablet was permanently transparent, weighed about 1 ounce and had a volume of about 3 cubic inches.

It will be understood that the preceding examples and the forms of die, shown in the drawing and specifically described hereinbefore, are given for illustrative purposes solely and that many variations and modifications can be made therein without departing from the spirit or scope of our invention. The form of the dies may be widely varied and may be as complex or as simple as desired. The size and number of the orifices may be widely varied. Also, the temperatures and pressures employed may be varied as desired. Accordingly, our invention is not to be limited to the specific embodiments herein disclosed, but we intend to cover our invention broadly as in the appended claims.

It will be apparent from the preceding disclosure that we have provided a very simple novel process for successfully preparing permanently transparent tablets of camphor which is easy to operate in a rapid manner.

We claim:

1. The process of making permanently transparent tablets of camphor which comprises placing a charge of opaque camphor in a die having the shape of the desired tablet and provided with an orifice, applying pressure to the charge sufficient to render the camphor plastic and to cause it first to conform to the die and second to cause a small proportion of the camphor to be extruded through the orifice, maintaining the charge at a temperature below 175° C. during the application of the pressure, releasing the pressure from the charge as soon as the small proportion of the camphor has been extruded, and then removing the tablet from the die.

2. The process of making permanently transparent tablets of camphor which comprises placing a charge of opaque camphor in a die having the shape of the desired tablet and provided with an orifice of a size such that camphor may be forced through it only when the camphor is in a plastic state, applying pressure to the charge sufficient to render the camphor plastic and to cause it first to conform to the die and second to cause a small proportion of the camphor to be extruded through the orifice, maintaining the charge at a temperature below 175° C. during the application of the pressure, releasing the pressure from the charge as soon as the small proportion of the camphor has been extruded, and then removing the tablet from the die.

3. The process of making permanently transparent tablets of camphor which comprises placing a charge of opaque camphor in a die having the shape of the desired tablet and provided with an orifice having a diameter of from about $\frac{1}{32}$ to $\frac{1}{8}$ inch, applying pressure to the charge sufficient to render the camphor plastic and to cause it first to conform to the die and second to cause a small proportion of the camphor to be extruded through the orifice, maintaining the charge at a temperature below 175° C. during the application of the pressure, releasing the pressure from the charge as soon as the small proportion of the camphor has been extruded, and then removing the tablet from the die.

4. The process of making permanently transparent tablets of camphor which comprises placing a charge of opaque camphor in a die having the shape of the desired tablet and provided with an orifice, applying pressure to the charge sufficient to render the camphor plastic and to cause it first to conform to the die and second to cause from about 0.01% to about 10% of the camphor to be extruded through the orifice, maintaining the charge at a temperature below 175° C. during the application of the pressure, releasing the pressure from the charge as soon as the aforementioned percentage of the camphor has been extruded, and then removing the tablet from the die.

5. The process of making permanently transparent tablets of camphor which comprises placing a charge of opaque camphor in a die having the shape of the desired tablet and provided with an orifice of a size such that camphor may be forced through it only when the camphor is in a plastic state, applying pressure to the charge sufficient to render the camphor plastic and to cause it first to conform to the die and second to cause from about 0.01% to about 10% of the camphor to be extruded through the orifice, maintaining the charge at a temperature below 175° C. during the application of the pressure, releasing the pressure from the charge as soon as the aforementioned percentage of the camphor has been extruded, and then removing the tablet from the die.

6. The process of making permanently transparent tablets of camphor which comprises placing a charge of opaque camphor in a die having the shape of the desired tablet and provided with an orifice having a diameter of from about $\frac{1}{32}$ to $\frac{1}{8}$ inch, applying pressure to the charge sufficient to render the camphor plastic and to cause it first to conform to the die and second to cause from about 0.01% to about 10% of the camphor to be extruded through the orifice, maintaining the charge at a temperature below 175° C. during the application of the pressure, releasing the pressure from the charge as soon as the aforementioned percentage of the camphor has been extruded, and then removing the tablet from the die.

7. The process of making permanently transparent tablets of camphor which comprises placing a charge of opaque camphor in a die having the shape of the desired tablet and provided with an orifice having a diameter of from about $\frac{1}{32}$ to $\frac{1}{8}$ inch, applying pressure to the charge sufficient to render the camphor plastic and to cause it first to conform to the die and second to cause from about 0.01% to about 1% of the camphor to be extruded through the orifice, maintaining the charge at a temperature below 175° C. during the application of the pressure, releasing the pressure from the charge as soon as the aforementioned percentage of the camphor has been extruded, and then removing the tablet from the die.

GASTAO ETZEL.
THOMAS EDWARD DILLON.